US007695523B2

(12) United States Patent
Corradini et al.

(10) Patent No.: US 7,695,523 B2
(45) Date of Patent: Apr. 13, 2010

(54) CLEANING METHOD

(75) Inventors: Fabio Corradini, Mira (IT); Mike Kosub, Bruchsal (DE)

(73) Assignee: Reckitt Benckiser N.V., Hoofddorp (NL)

( * ) Notice: Subject to any disclaimer, the term of this patent is extended or adjusted under 35 U.S.C. 154(b) by 0 days.

(21) Appl. No.: 10/508,670

(22) PCT Filed: Feb. 7, 2003

(86) PCT No.: PCT/GB03/00546

§ 371 (c)(1),
(2), (4) Date: Oct. 26, 2004

(87) PCT Pub. No.: WO03/080918

PCT Pub. Date: Oct. 2, 2003

(65) Prior Publication Data

US 2005/0156141 A1 Jul. 21, 2005

(30) Foreign Application Priority Data

Mar. 22, 2002 (GB) ................................ 0206724.7

(51) Int. Cl.
*C02F 5/02* (2006.01)
*C02F 5/04* (2006.01)
*C02F 5/10* (2006.01)
*C02F 5/14* (2006.01)

(52) U.S. Cl. .......................................... 8/137; 252/175

(58) Field of Classification Search ................. 252/175; 8/137

See application file for complete search history.

(56) References Cited

U.S. PATENT DOCUMENTS

| | | | | |
|---|---|---|---|---|
| 2,099,743 | A * | 11/1937 | Kroeger | 252/175 |
| 4,120,653 | A * | 10/1978 | Smolka | 8/137 |
| 4,464,839 | A | 8/1984 | Sadeh | 33/1 M |
| 4,820,439 | A | 4/1989 | Rieck | 252/135 |
| 5,062,941 | A * | 11/1991 | Sue | 205/717 |
| 2002/0077264 | A1* | 6/2002 | Roberts et al. | 510/296 |
| 2006/0123557 | A1* | 6/2006 | Caswell et al. | 8/115.51 |

FOREIGN PATENT DOCUMENTS

| | | | |
|---|---|---|---|
| AU | 743943 | | 9/2001 |
| DE | 33 12328 | A1 | 10/1984 |
| DE | 36 40881 | A1 | 6/1988 |
| EP | 0323395 | * | 5/1989 |
| EP | 0 323 395 | A2 | 7/1989 |
| EP | 0 384 070 | A2 | 8/1990 |
| EP | 0 561 446 | A2 | 9/1993 |
| EP | 0 812 808 | A1 | 12/1997 |
| EP | 0 892 040 | A2 | 1/1999 |
| EP | 0 992 238 | A1 | 4/2000 |
| EP | 1 026 230 | A1 | 8/2000 |
| EP | 1085118 | A | 3/2001 |
| EP | 1 103 599 | A1 | 5/2001 |
| GB | 1 429 143 | | 5/1974 |
| GB | 2028160 | A | 3/1980 |
| GB | 2086954 | A | 5/1982 |
| GB | 2346319 | A | 5/1999 |
| GB | 2337997 | A | 6/1999 |
| JP | 8041780 | | 2/1996 |
| JP | 10219297 | | 8/1998 |
| WO | WO 88/06199 | A | 8/1988 |
| WO | WO 92/06151 | | 4/1992 |
| WO | 01/98447 | * | 12/2001 |
| WO | WO 01/98447 | A2 | 12/2001 |
| WO | WO 02/20361 | A1 | 3/2002 |
| WO | WO 03/038027 | A1 | 5/2003 |

OTHER PUBLICATIONS

Material Safety Data Sheet Liquid Citric Acid, Jan. 16, 2001.*
Combined Search and Examination Report from The Patent Office in Great Britain for Application No. GB 0206724.7, dated Jul. 26, 2002.
Database WPI; Section Ch, Week 199616; Derwent Publications Ltd., London, GB; AN 1996-157617; XP002157091 & JP 08 041780 A (Nikka Kagaku KK), Feb. 13, 1996; abstract.
Database WPI; Section Ch, Week 199843; Derwent Publications Ltd., London, GB; AN 1998-501980; XP002243414 & JP 10 219297 A (Lion Corp), Aug. 18, 1998; abstract.

* cited by examiner

*Primary Examiner*—Lorna M Douyon
*Assistant Examiner*—Amina Khan
(74) *Attorney, Agent, or Firm*—Norris McLaughlin & Marcus, P.A.

(57) ABSTRACT

This invention relates to a method of softening water and/or in which the deposition of hard water scale is inhibited. The invention relates in particular to such a method carried out in a domestic environment, in particular in ware-washing machines. In particular the method relates to the softening of water after the main wash of a ware-washing machine, in particular in the rinse cycle of a ware-washing machine. The invention also relates to water-softening compositions for such methods.

13 Claims, 1 Drawing Sheet

(a)

(b)

CLEANING METHOD

This application is a 371 national phase application of PCT/GB03/00546 (now WO 03/080918), filed on 7 Feb. 2003.

This invention relates to a method of softening water and/or in which the deposition of hard water scale is inhibited. The invention relates in particular to such a method carried out in a domestic environment, in particular in ware washing machines. In particular the method relates to the softening of water after the main wash of a ware washing machine. The invention also relates to water-softening compositions for such methods.

It is well known that certain metal compounds, notably calcium compounds, when present in water, have a significant effect on the properties of the water. For example, "hard" water containing a significant loading of soluble calcium and magnesium compounds may require a large amount of soap or detergent in order to form a lather. Scale deposits can readily form from such water, for example on heating or pH change or evaporation. These can be incrustations, which are left on a surface that has come into contact with the hard water. Particular issues arise in ware washing machines, such as dish and clothes washing machines. In particular incrustations and watermarks may be left on the surfaces of the machines as well as the items washed therein. In particular issues arise with incrustation of heating elements, which reduced their life span and efficiency. A further issue arises in that water marks may be left on the hard surfaces of items washed in the dish washer and in fact incrustation can be found on the surface of clothes washed in the clothes washing machines which are perceptible to the wearer as feeling harsh to the touch.

There have been many proposals for removal of metal ions from aqueous solutions. In the industrial context proposals have included filter beds and polymeric filters for capturing heavy metal ions from an aqueous solution flowing within a passageway. Examples are given in EP992238A and GB20869564A. In the domestic context chelating compositions can be added to an aqueous washing solution and these can capture metal ions, such as calcium ions. Examples of chelating compositions are given in EP892040A.

Typically in clothes washing machines cleaning compositions are provided which are "built" which provide a water softening effect and an increase in the performance of the detergent. In addition products can be used (such as sold under the brand name Calgon in Europe) which are added on top of cleaning compositions which have a water softening effect. However, such compositions are not effective for softening the water in the rinse cycle of clothes washing machines since such compositions are pumped out of the machine along with the dirty water prior to the rinse cycle.

We have found that by providing a water-softening agent to the rinse cycle of a clothes washing machine significant benefits can be found, such as reduction in the amount of incrustation and/or water marks. In addition we have found benefits on the softness of the fabrics after the wash, a reduction in the degree of shrinkage of the fabrics and a reduction in the amount of wrinkles found on the fabrics after the wash. In addition we have found that traces of the detergent from the main wash are better removed from the fabric in the rinse cycle by the addition of a water-softening active in the rinse cycle of the clothes washing machine.

Therefore, we present as a feature of the invention a method of softening the water in the rinse cycle of a clothes washing machine, by providing a water-softening agent to the water of the rinse cycle of the clothes washing machine.

We present as a further feature of the invention a method of reducing the shrinkage of fabric (preferably natural fibres such as cotton, wool or silk) after a wash of the fabric in a clothes washing machine, comprising adding to the water in the rinse cycle of the clothes washing machine a water-softening agent.

We present as a further feature of the invention a method of reducing the amount of wrinkles present in a fabric after a wash of the fabric in a clothes washing machine comprising adding to the water in the rinse cycle of the clothes washing machine a water-softening agent.

We present as a further feature of the invention a method of assisting the removal of detergent cleaning composition residue present in a fabric after a wash of the fabric in a clothes washing machine comprising adding to the water in the rinse cycle of the clothes washing machine a water-softening agent.

Preferably the water-softening agent is present in a composition, which composition is substantially free from any surfactant, and/or bleach.

A further feature of the invention is a rinse additive composition comprising:

a) 5 to 90% (preferably 5to 20%) by weight of at least one water-softening agent, and
b) 0 to 90% (preferably 40 to 90%) by weight of water.

A further feature of the invention is a rinse additive consisting of, or consisting essentially of:

a) 5 to 90% (preferably 5 to 10%) by weight of at least one water-softening agent,
b) 0 to 90% (preferably 40 to 90%) by weight of water, and
c) 0 to 20% (preferably up to 15%) by weight of at least one ingredient selected from; perfume, pH adjusting agent (an acid and/or a base), pH buffer and preservative.

A further feature of the invention is a kit of parts comprising a) a rinse additive composition, as described herein, and
b) instructions for the user of the product to add the rinse additive to the rinse cycle of a clothes washing machine.

Figure 1:
FIGS. 1(*a*) and 1(*b*)—depicts the effect of various detergents on cotton swatches.
Figure 1:

A number of different techniques can be envisaged for the delivery of a water-softening agent to a clothes washing machine during the rinse cycle.

A simple technique can be used in a clothes washing machine where the water-softening agent is added into the dispensing drawer, usually reserved for the fabric conditioner. Alternatively a "rinse hold" cycle is selected on the clothes washing machine, found on most machines so that the user may add bleach to the rinse cycle, and the water-softening agent is added directly to the water of the rinse cycle, optionally in addition to a bleaching composition.

A more sophisticated technique would be to provide sustained release of the water-softening active through the wash and rinse cycle in a single product. Delayed release of the water-softening agent could be used such that the agent is released during the rinse cycle only, or substantially most of the composition (greater than 50%) is released into the rinse cycle.

Delayed or sustained release can be achieved in several ways.

Increasingly popular is the delivery of cleaning and water-softening compositions as compressed compositions, typically a tablet. These are convenient, providing a unit dosage which is easily handled.

Multi-region compressed compositions are now of interest in being able to provide such advantages as sustained release of active(s), or delayed release of active(s) from one or more separate region of a compressed composition. Delayed or sustained release can be achieved by pressing each region with different forces or selecting different ingredients, such as adding disintegrants, to produce dissolution of each region at different times during the wash and/or the rinse cycle.

It is a preferred feature of the invention that there is provided water-softening active(s) during the wash and the rinse cycle. This may be provided by a single composition that releases active during both cycles or two distinct compositions which are used independently for each cycle.

Therefore, we present as a feature of the invention a kit of parts comprising 1) a first composition comprising at least one water-softening active;
2) a second composition comprising at least one water-softening active; and
3) instructions for the user of the product to add the first composition to the wash cycle of a clothes washing machine and to add the second composition to the rinse cycle of a clothes washing machine.

The first and second composition may be in the form of a single item (such as a multi-region tablet or a dual chambered bottle) or two separate items (such as a tablet and a liquid).

Preferred product formats are:

1. Liquid
   a. A water softening liquid composition in a liquid dispensing container. In use the water softening liquid composition is dispensed into the rinse cycle of the clothes washing machine or the same composition is added into the main wash and rinse cycle of the washing machine.
   b. Two water softening liquid compositions. In use one composition is added to the main wash and the second composition is added to the rinse. The two liquid compositions are either held in two separate liquid dispensing containers or a single double chambered liquid dispensing container.

2. Solid
   A water softening solid composition, presented as a powder, granulate or tablet. In use either the composition is added to the rinse cycle of the clothes washing machine or the same composition is added to the main wash and the rinse cycle of the clothes washing machine. Alternatively different solid compositions are dispensed into the main wash and the rinse cycle of the clothes washing machine.

Preferred amounts of water softening agent are from 2 to 40% by weight, ideally 5 to 20% by weight. There are three main types of method of action for water-softening agents, described below.

1) Ion exchange agents—such agents include alkali metal (preferably sodium) aluminosilicates either crystalline, amorphous or a mixture of the two. Such aluminosilicates generally have a calcium ion exchange capacity of at least 50 mg CaO per gram of aluminosilicate, comply with a general formula:

$$0.8\text{-}1.5\ Na_2O.Al_2O_3.0.8\text{-}6\ SiO_2$$

and incorporate some water. Preferred sodium aluminosilicates within the above formula contain 1.5-3.0 $SiO_2$ units. Both amorphous and crystalline aluminosilicates can be prepared by reaction between sodium silicate and sodium aluminate, as amply described in the literature.

Suitable crystalline sodium aluminosilicate ion-exchange detergency builders are described, for example, in GB 1429143 (Procter & Gamble). The preferred sodium aluminosilicates of this type are the well known commercially available zeolites A and X, and mixtures thereof. Also of interest is zeolite P described in EP 384070 (Unilever).

Another class of compounds are the layered sodium silicate builders, such as are disclosed in U.S. Pat. No. 4,464,839 and U.S. Pat. No. 4,820,439 and also referred to in EP-A-551375.

These materials are defined in U.S. Pat. No. 4,820,439 as being crystalline layered, sodium silicate of the general formula $$NaMSi_xO_{2x+1}.YH_2O$$

wherein

M denotes sodium or hydrogen, x is from 1.9 to 4 and y is from 0 to 20.

Quoted literature references describing the preparation of such materials include Glastechn. Ber. 37,194-200 (1964), Zeitschrift für Kristallogr. 129, 396-404 (1969), Bull. Soc. Franc. Min. Crist., 95, 371-382 (1972) and Amer. Mineral, 62, 763-771 (1977). These is materials also function to remove calcium and magnesium ions from water, also covered are salts of zinc which have also been shown to be effective water softening agents.

2) Ion capture agents—agents which prevent metal ions from forming insoluble salts or reacting with surfactants, such as polyphosphate, monomeric polycarboxylates, such as citric acid or salts thereof, polycarboxylate polymers, such as polyacrylates, acrylic/maleic copolymers, and acrylic phosphonates, EDTA, algins, alginates. Heptonates/glucoheptonates and gluconates are especially preferred.

3) Anti-nucleating agents—agents that prevent seed crystal growth, such as polycarboxylate polymers, such as polyacrylates, acrylic/maleic copolymers, and acrylic phosphonates, and sulfonates. Such polymers may also act as ion capture agents as well. Phosphonates and nonionic poly carboxylates, such as citrates, are especially preferred.

Preferred water softening agents are water-soluble and include the following polycarboxylate polymers, such as polyacrylates, acrylic/maleic copolymers, and acrylic phosphonates; monomeric polycarboxylates such as citrates; heptonates; glucoheptonates; gluconates; oxydisuccinates; glycerol mono- di- and trisuccinates; carboxymethyloxysuccinates; carboxymethyloxymalonates; dipicolinates; hydroxyethyliminodiacetates; phosphonates; iminodisuccinates; polyaspartic acids; BHT; phosphonate stabilisers such as, diethylenetriaminepenta (methylene phosphonic acid and its corresponding pentasodium salt available under the trade names Dequest 2060 and Dequest 2066 Monsanto Chemical Co), DTPMP and DTPMA (Dequest 2010) and HEDP.

Preferably the water-soluble water softening agent is a neutralised or partially neutralised carboxylic acid, such as citric acid, succinic acid or maleic acid, and/or a neutralised or partially neutralised polycarboxylic acid, such as a polyacrylate of Mw: 4000-8000 (such as Acusol 445N (Rohm & Haas) CAS REG Nr. 66019-18-9 or Sokalan from BASF) and/or gluconates or polyaspartates or heptonates (such as Crodaquest series by Croda).

The invention will now be described, by way of embodiment, with reference to the following examples.

Liquid Composition

A non-thickened aqueous solution containing, as actives, 5 to 60% by weight of a citrate/ citric acid mixture and 5 to 60% by weight of sodium heptonate. This solution can be dosed in equal amounts (10 to 100 ml, ideally 10 to 70 ml) in the main wash, with a wash detergent, and in the fabric softener compartment. A perfume is a preferred additional ingredient in the composition. Additional water-softening actives which may be added are 0.1 to 20% by weight of a phosphate, polyphosphonate or a mixture thereof.

Solid Composition

A powder containing, as actives, 5 to 60% by weight of a citrate/citric acid mixture, 5 to 60% by weight of sodium heptonate, and, optionally, 0.1 to 20% by weight of a phosphate, polyphosphonate or a mixture thereof.

Dual Chamber Bottle

Two water softening liquid compositions in the format of a dual chamber bottle (or two bottles attached or packaged together).

- One chamber/bottle with a concentrated water-softening composition as a thick gel, dosed together with a wash detergent in the main wash, dosing of 10 to 100 ml, ideally 10 to 70 ml. The gel is a pure liquid polyacrylate, such as one of the products under the Acusol brand (Rohm & Haas). These polymers are available as a thick water solution (usually 40-50% by weight). The water softening agent being 10 to 30% by weight of a homo or co polymer of polyacrylic acid neutralised (completely or partially) with an inorganic base and 5 to 20% by weight of citric acid neutralised (completely or partially) with an inorganic base. The remaining part of the composition being, optionally, further ingredients, such as perfume, dye etc.
- The second chamber/bottle has a non-thickened aqueous solution containing, as an active, 5 to 60% by weight of a citrate/citric acid mixture. It must be dosed in the fabric softener compartment. A perfume is a preferred additional ingredient in the composition.

Additional actives which may be added are 0.1 to 20% by weight of a phosphate, polyphosphonate or a mixture thereof.

Rinse Additive

The citrate formula described above in the second chamber/bottle may be used as a rinse additive.

Results (a) Incrustation on heating elements and fabric (Wrinkle Test)

Standard cotton swatches (WFK 10A) were washed with (a) detergent alone (Dash Essential-Italy) and (b) detergent +16 ml of a water softening composition (100% Acusol 445, which is a 48% water solution of polyacrylic acid partially neutralised) added to the main wash and 35 ml of a water-softening composition (9% citric acid/31.2% trisodium citrate bihydrated/59.8% water) added to the rinse cycle of a Siemens Siwamat 5020 machine set at 60° C. and washed 24 times with a set water hardness of 43° fH.

| Detergent | Dash ® Essential (a) | Dash ® Essential | Dash ® Essential (b) |
|---|---|---|---|
| (dosage) Additive | 236 g | 236 g (*) | 168 g Acusol ® in Main Wash (16 ml) and citrate/citric solution (35 ml) in last rinse |

-continued

| Detergent | Dash ® Essential (a) | Dash ® Essential | Dash ® Essential (b) |
|---|---|---|---|
| Heating Element Incr. (mg) | 1010 | 90 | 30 |
| Laundry ash % at 550° C. Empa 221 | 11.35 | 1.05 | 2.95 |
| Laundry ash % at 550° C. Wfk 10A | 9.52 | 1.34 | 1.33 |
| Laundry ash % at 550° C. Honey Comb | 6.1 | 0.6 | 0.79 |

Main Wash and Rinse with 43° fH. hardness water except (*) where the rinse cycle was with deionised water.

Wrinkle Test

The cotton swatches tested above were analysed for the presence of wrinkles. The results are shown at FIG. 1.

The invention claimed is:

1. A method of softening the water in the rinse cycle of a clothes washing machine by providing an acidic water-softening composition which is a liquid or a solid selected from a powder, granulate or tablet and consists of (a) 5 to 90% by weight of at least one water-softening agent, (b) 0 to 90% by weight water, and (c) up to 20% by weight of at least one ingredient selected from the group consisting of perfume, pH adjusting agent, pH buffer and preservative and which is substantially free from a surfactant and a bleach to the water of the wash cycle and to the water of the rinse cycle of the clothes washing machine, wherein the water-softening composition is added into the fabric softening dispensing drawer of the clothes washing machine from where it is subsequently provided to the water of the rinse cycle of the clothes washing machine, and wherein incrustations and/or watermarks left on surfaces of the clothes washing machine and optionally fabrics is reduced.

2. A method as claimed in claim 1, wherein the water-softening agent is water-soluble and is selected from the group consisting of polycarboxylate polymers; monomeric polycarboxylates; heptonates; glucoheptonates; gluconates; oxydisuccinates; glycerol mono- di- and trisuccinates; carboxymethyloxysuccinates; carboxymethyloxymalonates; dipicolinates; hydroxyethyliminodiacetates; phosphonates; iminodisuccinates; polyaspartic acids; butylated hydroxy toluene (BHT); and phosphonate stabilisers.

3. A method as claimed in claim 1, wherein the water-softening agent is within a liquid composition.

4. A method according to claim 1, wherein the acidic water-softening composition consists of:

(a) 5 to 10% by weight of at least one water-softening agent, (b) 40 to 90% by weight water, and (c) up to 15% by weight of at least one ingredient selected from the group consisting of perfume, pH adjusting agent, pH buffer and preservative.

5. A method as claimed in claim 1, wherein the polycarboxylate polymers are selected from the group consisting of polyacrylates, acrylic/maleic copolymers, and acrylic phosphonates.

6. A method as claimed in claim 1, wherein the monomeric polycarboxylates are citrates.

7. A method according to claim 1, wherein the acidic water-softening composition consists of:

(a) 5 to 20% by weight of at least one water-softening agent, (b) 40 to 90% by weight water, and (c) up to 20% by weight of at least one ingredient selected from the group consisting of perfume, pH adjusting agent, pH buffer and preservative.

8. A method according to claim 1 wherein the acidic water-softening composition is a multi-region tablet.

9. A method of reducing the shrinkage of fabric after the wash of the fabric in a clothes washing machine, comprising adding to the water in the wash cycle and to the water in the rinse cycle of the clothes washing machine an acidic water softening composition consisting of (a) 5 to 90% by weight of at least one water-softening agent, (b) 0 to 90% by weight water, and (c) up to 20% by weight of at least one ingredient selected from the group consisting of perfume, pH adjusting agent, pH buffer and preservative which is a liquid or a solid selected from a powder, granulate or tablet and which is free from a surfactant and a bleach, and wherein incrustations and/or watermarks left on surfaces of the clothes washing machine and optionally fabrics is reduced.

10. A method of reducing shrinkage as claimed in claim 9 which method is applied to natural fabrics selected from the group consisting of cotton, wool and silk.

11. A method according to claim 9 wherein the acidic water-softening composition is a multi-region tablet.

12. A method of reducing the amount of wrinkles present in a fabric after a wash of the fabric in a clothes washing machine comprising adding to the water in the wash cycle and to the water in the rinse cycle of the clothes washing machine an acidic water-softening composition consisting of (a) 5 to 90% by weight of at least one water-softening agent, (b) 0 to 90% by weight water, and (c) up to 20% by weight of at least one ingredient selected from the group consisting of perfume, pH adjusting agent, pH buffer and preservative which is a liquid or a solid selected from a powder, granulate or tablet and which is free from a surfactant and a bleach, further wherein incrustations and/or watermarks left on surfaces of the clothes washing machine and optionally fabrics is reduced.

13. A method according to claim 12 wherein the acidic water-softening composition is a multi-region tablet.

* * * * *